US008677135B2

(12) United States Patent
Lauter et al.

(10) Patent No.: US 8,677,135 B2
(45) Date of Patent: Mar. 18, 2014

(54) DIGITAL SIGNATURES WITH ERROR POLYNOMIALS

(75) Inventors: Kristin E. Lauter, Redmond, WA (US); Elisabeth Malmskog, Fort Collins, CO (US); Michael Naehrig, Stolberg (DE); Vinod Vaikuntanathan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 12/970,942

(22) Filed: Dec. 17, 2010

(65) Prior Publication Data

US 2012/0159179 A1 Jun. 21, 2012

(51) Int. Cl.
*G06F 21/00* (2013.01)

(52) U.S. Cl.
USPC .......................................... 713/179

(58) Field of Classification Search
USPC .......................................... 713/179
See application file for complete search history.

(56) References Cited

U.S. PATENT DOCUMENTS

| 5,375,170 | A | 12/1994 | Shamir |
| 6,609,226 | B1 * | 8/2003 | Figueira ........................ 714/807 |
| 2001/0012361 | A1 * | 8/2001 | Kasahara ........................ 380/30 |
| 2001/0054053 | A1 * | 12/2001 | Lambert et al. ................ 708/492 |
| 2004/0151309 | A1 | 8/2004 | Gentry et al. |
| 2004/0210533 | A1 * | 10/2004 | Picker et al. .................... 705/51 |
| 2006/0239459 | A1 * | 10/2006 | Yamamichi et al. .......... 380/255 |
| 2008/0089514 | A1 | 4/2008 | Futa et al. |
| 2009/0235078 | A1 | 9/2009 | Futa et al. |

OTHER PUBLICATIONS

Mohassel, Payman, "One-Time Signatures and Chameleon Hash Functions", Retrieved from << http://pages.cpsc.ucalgary.ca/~pmohasse/SAC-2010.pdf >>, in Proceedings of Selected Areas in Cryptography, SAC 2010, pp. 18.
Huiyan, Chen, "CCA-Secure Cryptosystem from Lattice", Retrieved from << http://eprint.iacr.org/2010/127.pdf >>, Mar. 7, 2010, pp. 15.
Buchmann, et al., "Post-Quantum Cryptography: Lattice Signatures", Retrieved from << http://www.cdc.informatik.tu-darmstadt.de/~rlindner/publications/lattice%20signatures.pdf >>, 2009, pp. 1-27.

(Continued)

*Primary Examiner* — William Goodchild
(74) *Attorney, Agent, or Firm* — Holly Nguyen; Carole Boelitz; Micky Minhas (57) ABSTRACT

Representations of polynomials a, s, t, $e\_1$ and $e\_2$ can be provided. Values of coefficients of the polynomials can be limited, and can be computed using randomization techniques. A verification key can be generated to include representations of polynomials a, b, and c. Computation of b can include computing a product using a and s, and adding $e\_1$. Computation of c can include computing a product using a and t, and adding $e\_2$. A signing key can represent s and t. The signing key can be used to produce a message signature that can represent a sum of t and a product of s and m, with m being derived from a message to be signed. The verification key can be used to verify the signature by checking coefficient sizes of a polynomial represented by the signature, and of a checking polynomial derived from the verification key and the signature.

20 Claims, 5 Drawing Sheets (56) References Cited

OTHER PUBLICATIONS

Sakalauskas, Eligijus, "New Digital Signature Scheme in Gaussian Monoid", Retrieved from << http://www.mii.It/Informatica/pdf/INFO552.pdf >>, 2004, pp. 251-270.

Gentry, et al., "Cryptanalysis of the Revised NTRU Signature Scheme", Retrieved from << http://www.szydlo.com/ntru-revised-short02.pdf >>, 2002, pp. 1-22.

Hoffstein, et al., "Polynomial Rings and Efficient Public Key Authentication II", Retrieved from << http://www.securityinnovation.com/cryptolab/pdf/PASS2.pdf >>, 1999, pp. 1-17.

Stehle, et al., "Efficient Public Key Encryption Based on Ideal Lattices", Retrieved from << http://eprint.iacr.org/2009/285.pdf >>, 2009, pp. 1-19.

Lyubashevsky, Vadim, "Asymptotically Efficient Lattice-Based Digital Signatures", Retrieved from << http://cseweb.ucsd.edu/~lyubash/papers/signatures.pdf >>, 2008, pp. 18.

Lyubashevsky, et al., "On Ideal Lattices and Learning with Errors over Rings", Retrieved from << http://www.di.ens.fr/~pnguyen/LCD/LCD_Vadim.pdf >>, Slides, 2010, pp. 32.

Lyubashevsky, et al., "On Ideal Lattices and Learning with Errors over Rings", EUROCRYPT 2010, LNCS 6110, 2010, pp. 1-23.

* cited by examiner

DIGITAL SIGNATURES WITH ERROR POLYNOMIALS

BACKGROUND

It is common to send messages from a sending computer environment A to a receiving computing environment B over an insecure communication channel. However, nefarious entities might intercept the message that A is sending to B and substitute a different message without A or B knowing. To thwart such efforts, the message from A can be digitally signed with a signature that is difficult to forge, and B can subject the message and signature to a verification technique when receiving a message that is purportedly from A. Such digital signature schemes can provide some level of security in the form of assurance that the message received by B is the message that was sent by A. However, the level of that security can depend on how difficult it is for a nefarious entity to provide a forged signature that can pass B's authentication technique.

SUMMARY

Many different digital signature schemes have been used. However, many existing schemes may become insecure if higher capacity computing (e.g., quantum computing) becomes feasible. Additionally, many existing schemes are not efficient in practice. The described tools and techniques can include using digital signatures that can be verified using verification keys that are generated using error polynomials (polynomials that are included as error values to obscure signing key values used in calculating verification keys).

In an embodiment of the tools and techniques, representations of polynomials a, s, t, e_1 and e_2 can be provided, where e_1 and e_2 are error polynomials. Values of coefficients of the polynomials may be limited (e.g., limited to a range and/or limited by one or more weighting operations), and may be computed using randomization techniques. A verification key can be generated to include a representation of the polynomial a, as well as representation of polynomials b and c. Computation of polynomial b can include generating a product using polynomials a and s, and adding polynomial e_1. Computation of polynomial c can include computing a product using polynomials a and t, and adding polynomial e_2. A signing key can represent polynomials s and t.

The signing key may be used to produce a message signature. For example, the signature may represent a sum of t and a product of s and m, with m being derived from a message to be signed. The verification key can be used to verify the signature, such as by checking coefficient sizes of a polynomial represented by the signature and of a checking polynomial derived from the verification key and the signature.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved use of digital signatures. For example, the techniques and tools may provide high security digital signatures that use few computing resources when generating and/or verifying the digital signatures. Such improvements may result from the use of various techniques and tools separately or in combination.

Such techniques and tools may include generating a signing key and verification key pair (sk, vk). A signing technique can include generating a signature σ for the message using the signing key sk. A verification technique can use the verification key vk to verify that a received signature σ' is the correct signature for the message. In one implementation, a particular polynomial ring described below can be used to provide polynomials that can be used in generating the signing and verification keys. This implementation can be based on the hardness of a learning with errors problem over this ring. For example, a learning with errors problem can be a problem that a nefarious entity would face in trying to find a secret value s from a list of samples $S\_1, \ldots, S\_n$, where each sample $S\_i$ includes values a_i and b_i, and where $b_i = a_i \times s + e\_i$. In this implementation, the values in the samples can be polynomials, and error polynomials can be used to obscure polynomials from the signing key when calculating the verification key, as will be described more below. Based on the learning with errors problem, this implementation can provide security in the sense that it would be hard to forge a message and signature pair that would pass the verification technique, given access to only the verification key and to valid message and signature pairs.

As used herein, polynomials can be scaled and still considered to be the same polynomials. For example, if a polynomial s were used in the signing key, the coefficients for the polynomial s were all scaled by a factor of 2 before being used in the verification key calculation, then the polynomial s would still be considered to have been used in the signing key and the verification key.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
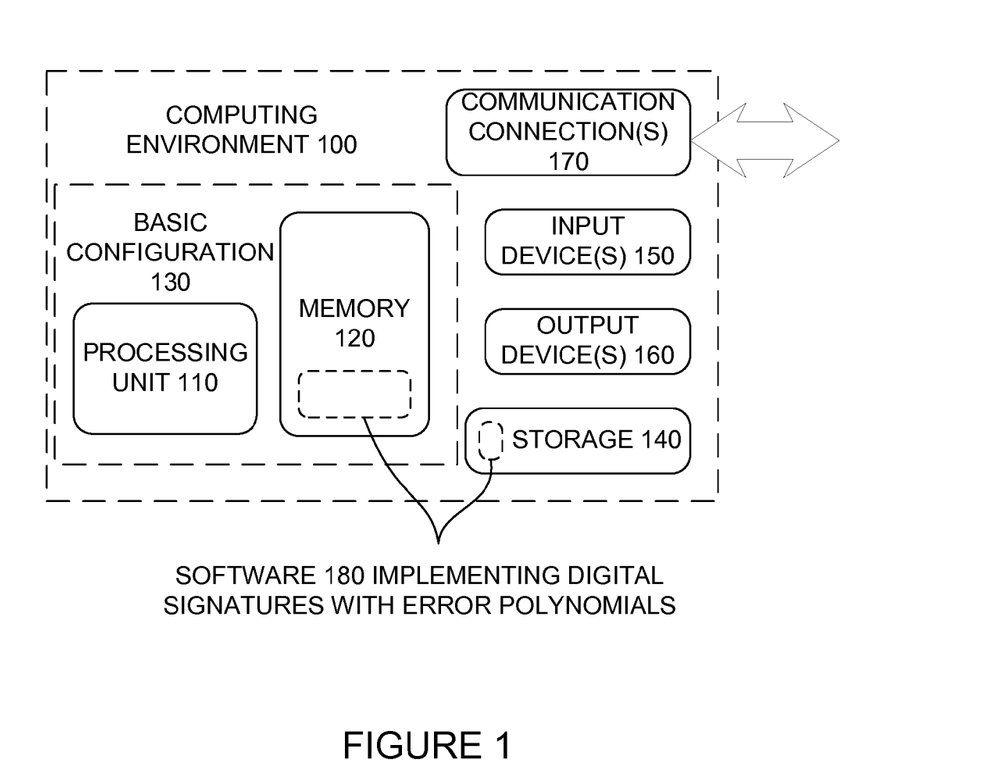
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an environment for key generation, signing, sending, receiving, and/or verifying signatures of messages. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing digital signatures with error polynomials.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available storage media that can be accessed within a computing environment, but the term computer-readable storage media does not refer to signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Digital Signature Scheme System and Environment

Figure 2:
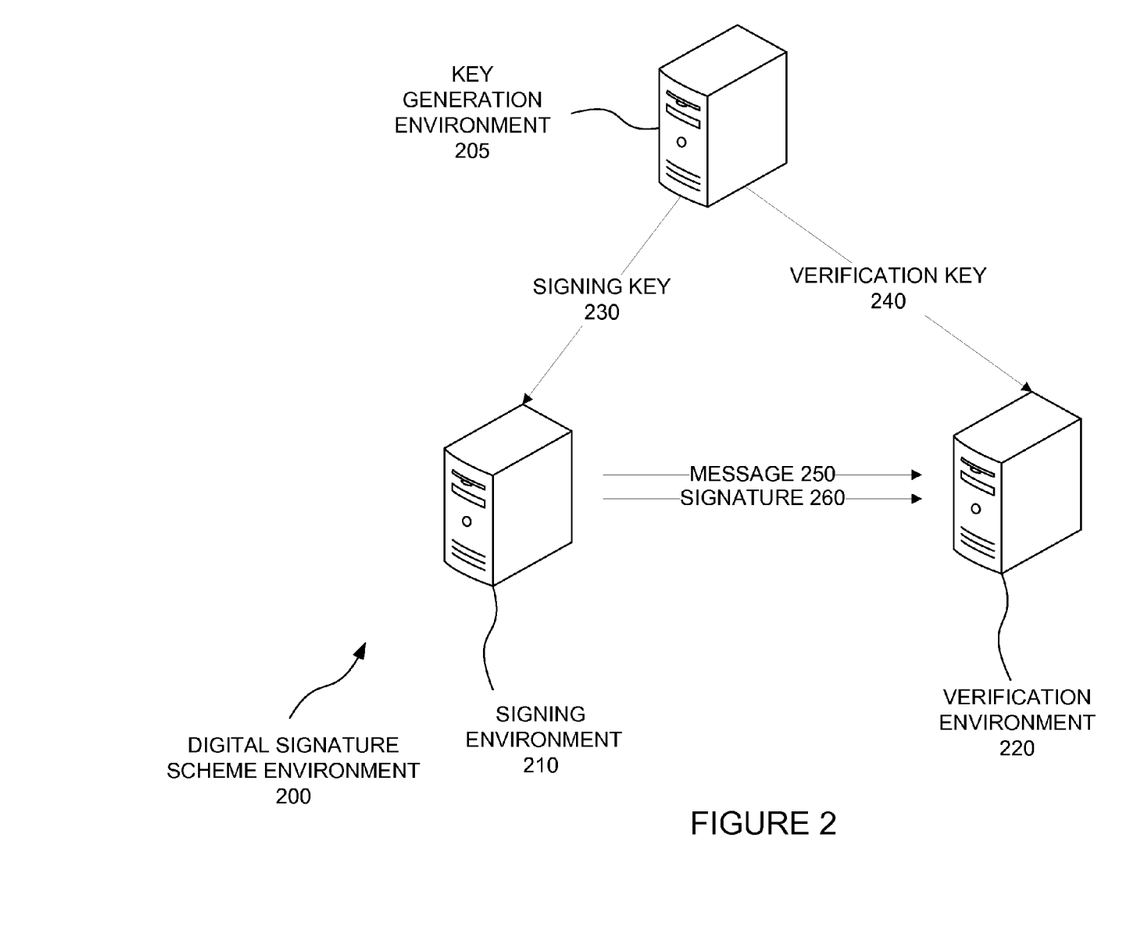
FIG. 2 is a schematic diagram of a digital signature scheme environment.

FIG. 2 is a schematic diagram of a digital signature scheme environment (200) in conjunction with which one or more of the described embodiments may be implemented. The digital signature scheme environment (200) can include a key generation environment (205), a signing environment (210), and a verification environment (220). While these environments (205, 210, and 220) are illustrated as separate environments in FIG. 2, two or more of the environments (205, 210, and/or 220) may be within a single physical and/or virtual machine. For example, a single machine may perform key generation and signing techniques.

A. Key Generation

The key generation environment (205) can generate a signing key (230) and a verification key (240). The signing key (230) can be provided to the signing environment (210), and the verification key (240) can be provided to the verification environment (220). For example, the verification key (240) may be sent to the signing environment (210), which can forward the verification key (240) to the verification environment. The verification key (240) can be public information, but the signing key (230) can be kept secret by the signing environment (210).

In one implementation, the signing key (230) and verification key (240) can represent polynomials. For example, the signing key (230) and verification key (240) can include representations of the coefficients of single variable polynomials, where the polynomials represented by the keys (230 and 240) can be computed from other polynomials. In one implementation, the polynomials used to compute the polynomials in the keys (230 and 240) can all have the same degree n−1, using a parameter q, which can be a prime number. Alternatively, the parameters q and/or degrees may be different for different polynomials. As an example, polynomials a, s, t, e_1, and e_2 can be computed by working over a ring R of polynomials in a domain of integers modulo q modulo a polynomial f(x) of degree n. The polynomials a, s, t, e_1, and e_2 can be elements chosen at random from R. For example, the polynomial a can be chosen with coefficients uniformly at random from the integers modulo q domain. The other polynomials s, t, e_1, and e_2 can be chosen with a randomization operation that is weighted toward zero in the integers modulo q domain using a discrete Gaussian distribution on the coefficients. For example, the samples can be taken from a Gaussian distribution with a mean of zero. The Gaussian distribution can have a standard deviation α, and the Gaussian distribution of values x can be given by Equation 1 below.

$$rho(x) = \frac{1}{\sqrt{2 \times \pi \times \alpha^2}} \times \exp\left(\frac{x^2}{2 \times \alpha^2}\right) \quad \text{Equation 1}$$

Accordingly, if x_1 and x_2 are two real values that could be sampled and x_1<x_2, the probability of choosing a value from x_1 to x_2 is given by the integral of rho(x) from x_1 to x_2. In using this Gaussian distribution to generate polynomial coefficients, discrete variables can be used, in particular the integers modulo q, where q is the parameter described above. Accordingly, the distribution described above can be multiplied by q and made discrete. To do this, each value sampled using the above probability density function can be multiplied by q and rounded to the nearest integer. This can give a discrete Gaussian distribution with a standard deviation of α x q. The values from this discrete distribution can be viewed as the elements of the integers modulo q domain to be used as values for the coefficients of the polynomials s, t, e_1, and e_2.

In one example, the order n may be chosen on the order of $10^3$ and q may be chosen on the order of $10^6$ or larger. The order n may be chosen as a value equal to 2 taken to a specified power k (i.e., $n=2^k$), and q may be chosen as a number that is much larger than n, such as greater than or equal to n to the third power. For example, n may be 1024 and q may be the next prime number larger than $n^3$, or 1,073,741,827. Alternatively, q may be another prime number larger than $n^3$ that fulfills a condition of q being 1 modulo (2×n), such as where q is 1,073,750,017.

The signing key sk can represent the polynomials s and t, as is illustrated in Equation 2 below.

$$sk=(s,t) \quad \text{Equation 2}$$

Additionally, the verification key vk can represent three polynomials. The first verification key polynomial can be the polynomial a. The second verification key polynomial can be a polynomial b, which can be the sum of the polynomial e_1 and a product of the polynomials a and s. The third verification key polynomial can be a polynomial c, which can be the sum of the polynomial e_2 and a product of the polynomials a and t. Thus, the verification key can represent the polynomials a, b, and c, as illustrated in Equation 3 below.

$$vk=(a, b=a \times s+e\_1, c=a \times t+e\_2) \quad \text{Equation 3}$$

As noted above, the verification key (240) can be public information, while the signing key can be kept secret by the signing environment (210). Accordingly, if the signing key (230) is provided to the signing environment (210) by a remote key generation environment (205), the signing key (230) may be sent in a secure manner (e.g., in encrypted form, in a secure communication channel, etc.). The verification key (240) may be published, such as by the key generation environment (205) and/or by the signing environment (210).

B. Message Signing

Using the signing key (230), the signing environment (210) can produce a digital signature (260) for a message (250), and can send the message (250) along with the corresponding digital signature (260) to the verification environment (220), or possibly just send the message (250) to the verification environment (220), such as where the verification environment (220) has access to the message (i.e., access to the message itself or an item such as a hash value that is derived from the message) in some other way.

As noted above, the signing key (230) can represent the polynomials s and t. The signing environment (210) can also derive another polynomial m from the message to be sent. For example, the polynomial m can be chosen as a small element of the ring R of polynomials discussed above. For example, the signing environment (210) can run a hash operation on the message (e.g., using one of the SHA family of hash functions) to produce a message digest, which can be a binary representation (i.e., a series of 1's and 0's). Those 1's and 0's can represent the coefficients of the polynomial m. The polynomial m may be of the same degree n−1 as the polynomials used to generate the signing key (230) and verification key (240).

The signature (260) can include a representation of a polynomial σ, which can be computed as a sum of the polynomial t and the product of the polynomials s and m, as illustrated by Equation 4 below.

$$\sigma = s \times m + t \quad \text{Equation 4}$$

C. Signature Verification

The verification environment (220) can verify the signature (260) of a received message (250) to verify that the message (250) is authentic with some level of security. To verify a supposed signature σ' for a received message, the verification environment (220) can check that the coefficients of σ' are not more than a predetermined size. Additionally, the verification environment (220) can check that coefficients of a checking polynomial cp are not more than a predetermined size. The checking polynomial cp can depend on the signature polynomial σ', and on the polynomials a, b, and c represented by the verification key (240). The checking polynomial cp can also depend on a polynomial m', which can be derived from the received message (250) by the verification environment (220) using the same technique that was used by the signing environment (210) to derive the polynomial m from the sent message. In one implementation, the checking polynomial cp may be computed as a difference between the product of the polynomials a and σ' and the sum of the polynomial c and the product of the polynomials b and m', as illustrated by Equation 5 below.

$$cp = a \times \sigma' - (b \times m' + c) \qquad \text{Equation 5}$$

The size of the coefficients in σ' and cp may be checked in one or more of various ways, such as by checking a size of the coefficients overall or by checking the size on a coefficient-by-coefficient basis. As an example, the verification environment (220) may check that a norm of a vector of the polynomial coefficients for the polynomial being checked does not exceed a maximum value. The maximum value (B) may be function of n (B(n)). In one example, B may be a function of n, α, q and another variable k (B(n, α,q,k)). For example, B(n, α,q,k) may be given by the following equation:

$$B(n,\alpha,q,k) = k \times \sqrt{\log(n)} \times \alpha \Delta q \Delta n \qquad \text{Equation 6}$$

In the equation above, n, α, and q can be as discussed above, and k can be a value that is determined according to the parameters of the digital signature scheme, such as n, α, and q. For example, k may have a value of 2. In one example, k can have a value of at least 5; n can have a value of $2^l$, where l is a whole number between 4 and 11, such as $2^{10}$, or 1024; q can be the next prime number larger than $n^3$ (such as 1,073,741,827 if n is 1024), a can be equal to one divided by the square root of q (such as 32,786.00005 if q is 1,073,741,827); a distribution for sampling the polynomials s and e_1 can be a spherical Gaussian distribution with a standard deviation of α×q; and a distribution for sampling the polynomials t and e_2 can be a spherical Gaussian distribution with a standard deviation of n×α×q+1 (although the Gaussian distribution for all these polynomials s, t, e_1, and e_2 may be the same distribution in some implementations).

The norm may be calculated as a Euclidian norm. Accordingly, in this example, the checking may check that the inequalities illustrated in Equation 7 and Equation 8 are true.

$$\text{norm}(\sigma') = \sqrt{\sigma'^2_0 + \sigma'^2_1 \ldots \sigma'^2_n} \leq B \qquad \text{Equation 7}$$

$$\text{norm}(cp) = \sqrt{cp^2_0 + cp^2_1 \ldots cp^2_n} \leq B \qquad \text{Equation 8}$$

In Equation 7, $\sigma'_0, \sigma'_1, \ldots, \sigma'_n$ are coefficients of the polynomial σ'; in Equation 8, $cp_0, cp_1, \ldots, cp_n$ are coefficients of the checking polynomial cp; and the maximum value B is as described above. Other alternative techniques may be used for checking the size of σ' and cp, and different values may be used as predetermined maximum values for σ' than for cp. For example, the verification environment (220) may check that none of the coefficients of σ' or cp exceed a predetermined scalar value. For example, the verification environment (220) may check that none of the coefficients exceed the maximum value equal to α×q×(n+1).

If the size of σ' and cp are each less than or equal to a predetermined value, then the signature representing the polynomial σ' can be considered verified, and the associated message can be considered to be authentic with some level of security. The level of security can be adjusted by adjusting parameters used in the digital signature scheme, such as values for n and k described above.

III. Techniques for Digital Signatures with Error Polynomials

Several techniques for digital signatures with error polynomials will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
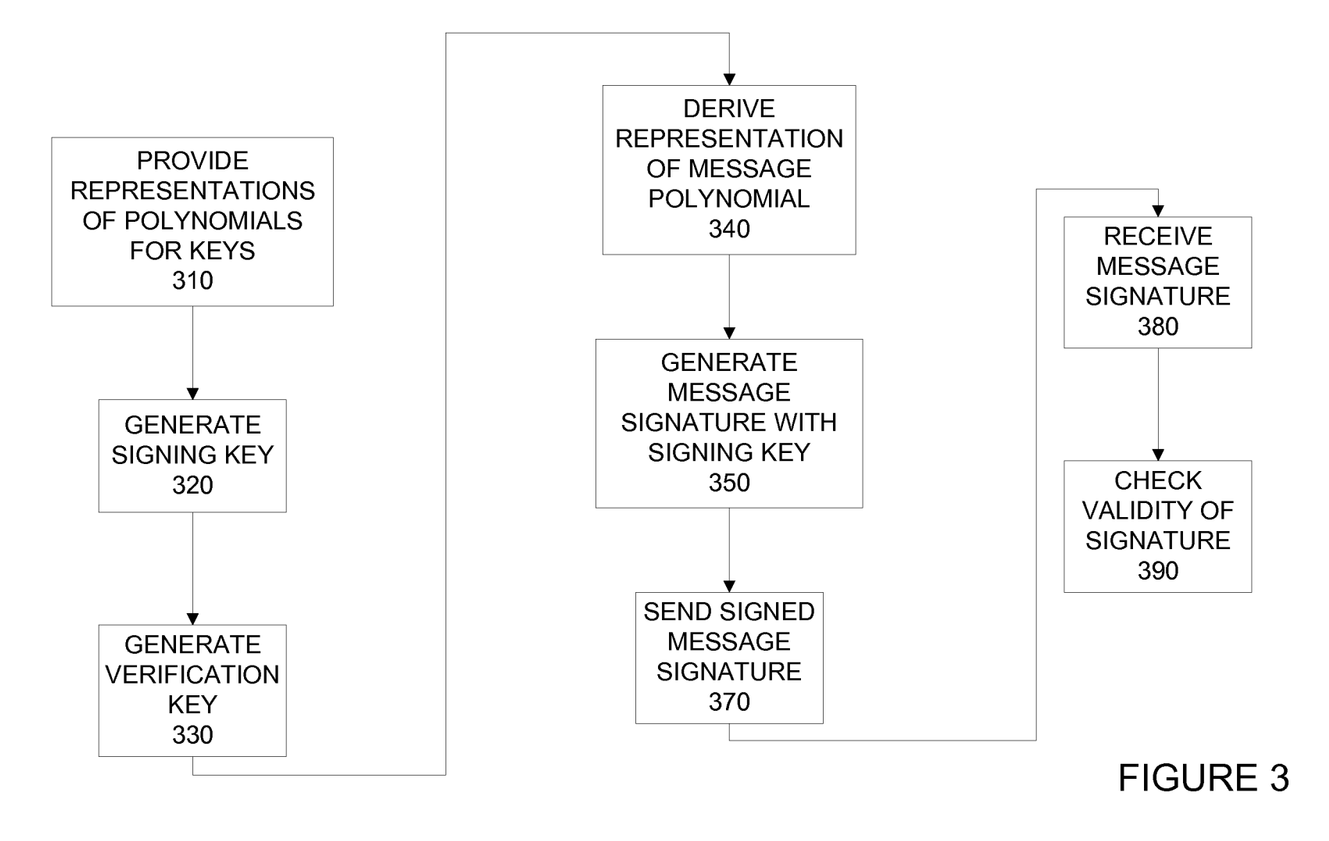
FIG. 3 is a flowchart of a technique for digital signatures with error polynomials.

Referring to FIG. 3, a technique for digital signatures with error polynomials will be described. The technique can include providing (310) representations of polynomials, such as a public verification key polynomial a, signing key polynomials s and t, and verification key error polynomials e_1 and e_2. Providing (310) the polynomials can include limiting values of coefficients of each of the polynomials a, s, t, e_1, and e_2, such as limiting the values to not exceed a specific value, and/or limiting the values by weighting a randomization function. Additionally, the technique can include generating (320) a signing key that includes a representation of the polynomial s and a representation of the polynomial t. The technique can also include generating (330) a verification key that includes a representation of the polynomial a, a representation of a polynomial b, and a representation of a polynomial c. The generation (330) of the verification key can include computing the polynomial b, which can include computing a product using the polynomial a and the polynomial s, and adding the polynomial e_1. The generation (330) can also include computing the polynomial c, which can include computing a product using the polynomial a and the polynomial t, and adding the polynomial e_2.

Providing (310) the representations of the polynomials a, s, t, e_1, and e_2 can include computing the polynomials a, s, t, e_1, and e_2 using a randomization technique. For example, providing (310) the polynomials may include deriving the error polynomials e_1 and e_2 using randomization techniques, such as techniques that include weighted randomizations to produce coefficients for the error polynomials e_1 and e_2. The polynomials a, s, t, e_1, and e_2 may be polynomials of degree n−1, and the polynomials may all have coefficients in a domain given by integers modulo a prime number q.

The technique can also include deriving (340) a representation of a message polynomial m from a message. A message signature can be generated (350) with the signing key. The signature generation (350) can include computing a product from the polynomial m and the polynomial s, and adding the polynomial t. Additionally, the message signature can be sent (370) from a first computing environment to a second computing environment. This sending (370) may be done in various ways, such as by sending (370) the message with the signature attached, sending the message and signature separately, or even sending just the signature without sending the message (such as where the second computing environment already has access to the message or to an item derived from the message that can be used in verification).

The technique of FIG. 3 can be performed such that coefficients of a polynomial represented by the message signature do not exceed a predetermined size. For example, the predetermined size may be a size of each of the coefficients of the polynomial represented by the message signature, with the coefficients being considered individually. However, the predetermined size may be an overall size of the coefficients of the polynomial represented by the message signature, with the coefficients being considered collectively. The predetermined size can be a size of a norm of a vector representing the coefficients of the polynomial represented by the message signature. Additionally, the technique can be such that coefficients of a checking polynomial do not exceed a second predetermined size. The checking polynomial can be a difference between a product of the polynomial a and a polynomial represented by a message signature, and a sum of the polynomial c and a product of the polynomials b and m. The polynomial represented by the message signature can include a sum of the polynomial t and a product of the polynomials s and m.

For the sake of clarity in this description, the message signature sent from the first computing environment can be termed a sent message signature, and the message used to generate the message signature can be termed a source message. A received message signature can be received (380) at the second computing environment. Validity of the received message signature can be checked (390). This validity checking (390) can include checking that coefficients of a polynomial represented by the received message signature do not exceed a first predetermined size. The validity checking (390) can also include computing a checking polynomial and checking that the coefficients of the checking polynomial do not exceed a second predetermined size (which may or may not be the same as the first predetermined size). The checking polynomial can be a polynomial computed from the polynomial a, the polynomial b, a polynomial represented by the received message signature, and a polynomial m' derived from a destination message. The validity checking (390) can further include computing the checking polynomial by multiplying the polynomial a by the polynomial represented by the received message signature, minus a sum of the polynomial c and a product of the polynomials b and m'.

Figure 4:
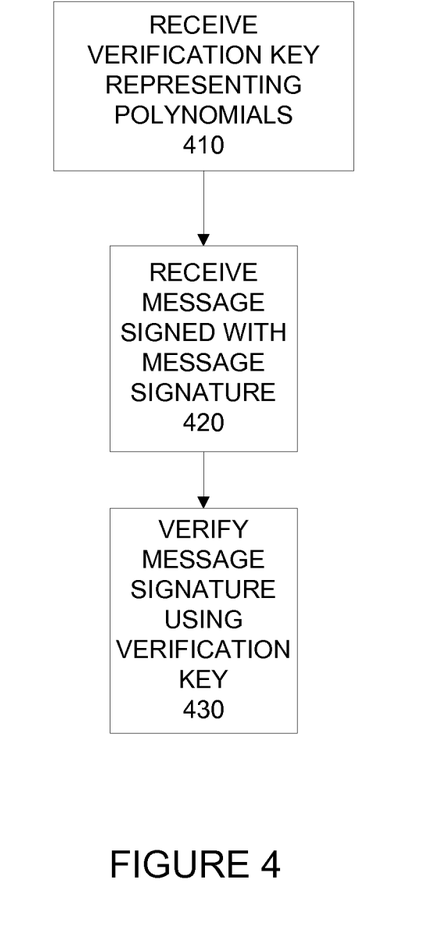
FIG. 4 is a flowchart of another technique for digital signatures with error polynomials.

Referring now to FIG. 4, another technique for digital signatures with error polynomials will be described. The technique can include receiving (410) a verification key.

The verification key can include a representation of a polynomial a. The verification key can also include a representation of a polynomial b, where the polynomial b can be derived from a sum of a polynomial $e\_1$ and a product of the polynomial a and a polynomial s. Additionally, the verification key can include a representation of a polynomial c, where the polynomial c can be derived from a sum of a polynomial $e\_2$ and a product of the polynomial a and a polynomial t. The polynomials a, s, t, $e\_1$, and $e\_2$ can be polynomials produced by a technique comprising randomization. A message signed with a message signature can be received (420). The message signature can include a sum of the polynomial t and a product of the polynomial s and a polynomial m. The polynomial m can be derived from the message, such as by an operation comprising a hash operation.

Additionally, the message signature can be verified (430) using the verification key. The verification (430) of the message signature can include verifying that coefficients of a polynomial represented by the message signature do not exceed a predetermined size. Additionally, the verification (430) can include verifying that coefficients of a checking polynomial computed from the polynomial m, the polynomial b, the polynomial c, and a polynomial represented by the message signature do not exceed a predetermined size. Accordingly, verifying (430) may include verifying at least two things: that coefficients of one or more polynomials represented by the message signature do not exceed a predetermined size; and that coefficients of a checking polynomial computed from the polynomial m, the polynomial b, the polynomial c, and a polynomial represented by the message signature do not exceed a predetermined size. The checking polynomial can be a difference between a product of the polynomial a and the polynomial represented by the message signature, and a sum of the polynomial c and a product of the polynomials b and m.

Figure 5:
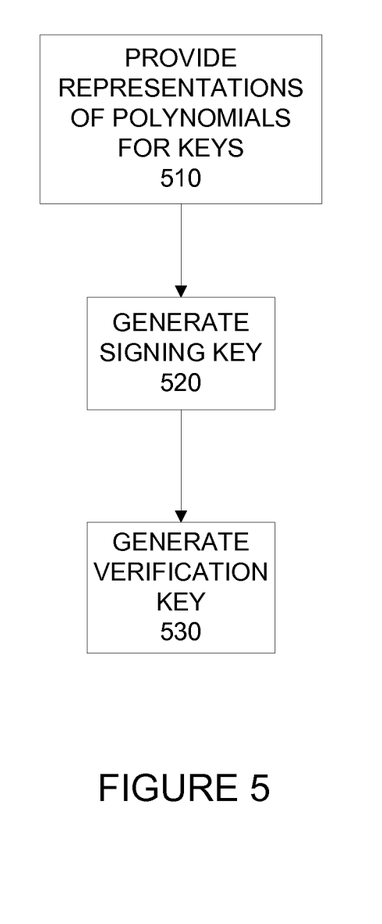
FIG. 5 is a flowchart of yet another technique for digital signatures with error polynomials.

Referring to FIG. 5, yet another technique for digital signatures with error polynomials will be described. The technique can include providing (510) representations of polynomials m, a, s, t, $e\_1$, and $e\_2$. Providing (510) these representations can include deriving the polynomial m from a message using a hash function, and computing the polynomials a, s, t, $e\_1$, and $e\_2$ using a randomization technique including one or more randomization operations at least one of which is weighted. Providing (510) the representations can also include limiting values of coefficients of each of the polynomials m, a, s, t, $e\_1$, and $e\_2$ to be within a range of values, and limiting the polynomials m, a, s, t, $e\_1$, and $e\_2$ to be of a degree n−1. The technique can also include generating (520) a signing key that includes a representation of the polynomial s and a representation of the polynomial t. A verification key can be generated (530). The verification key can include a representation of the polynomial a, a representation of a polynomial b, and a representation of a polynomial c. The generation (530) of the verification key can include computing the polynomial b, which can include adding the polynomial $e\_1$ to a product of the polynomial a and the polynomial s. The generation (530) can also include computing the polynomial c, which can include adding the polynomial $e\_2$ to a product of the polynomial a and the polynomial t.

Coefficients of a polynomial represented by a message signature can be such that they do not exceed a first predetermined size derived from the value n. The message signature can represent a polynomial derived from a sum computed using the polynomial t with a product computed using the polynomial m and the polynomial s. The coefficients of the polynomial m, the polynomial b, the polynomial c, and a polynomial represented by the message signature can be such that a checking polynomial that is a difference between a product of the polynomial a and the polynomial represented by the message signature, and a sum of the polynomial c and a product of the polynomials b and m does not exceed a second predetermined size derived from the value n.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   providing representations of a public verification key polynomial a, signing key polynomials s and t, and verification key error polynomials $e\_1$ and $e\_2$, providing the representations comprising:
   limiting values of coefficients of each of the polynomials a, s, t, $e\_1$, and $e\_2$; and
   computing the polynomials s, t, $e\_1$, and $e\_2$ using a randomization technique comprising one or more randomization operations;
   generating a signing key comprising a representation of the polynomial s and a representation of the polynomial t; and a key generation computer system generating a verification key comprising a representation of the polynomial a, a representation of a polynomial b, and a representation of a polynomial c, the generation of the verification key comprising:
- computing the polynomial b, the computation of the polynomial b comprising computing a product using the polynomial a and the polynomial s, and adding the polynomial e_1; and
- computing the polynomial c, the computation of the polynomial c comprising computing a product using the polynomial a and the polynomial t, and adding the polynomial e_2.

2. The method of claim 1, further comprising:
- deriving a representation of a message polynomial m from a message;
- generating a message signature with the signing key, the signature generation comprising computing a product from the polynomial m and the polynomial s, and adding the polynomial t; and
- sending the message signature from a first computing environment to a second computing environment.

3. The method of claim 2, wherein the message signature is a sent message signature, the message is a source message, and wherein the method further comprising:
- receiving a received message signature at the second computing environment; and
- checking a validity of the received message signature, the validity checking comprising checking that coefficients of a polynomial represented by the received message signature do not exceed a first predetermined size.

4. The method of claim 3, wherein the validity checking further comprises computing a checking polynomial and checking that the coefficients of the checking polynomial do not exceed a second predetermined size, the checking polynomial being computed from the polynomial a, the polynomial b, a polynomial represented by the received message signature, and a polynomial m' derived from a destination message.

5. The method of claim 4, wherein the validity checking further comprises computing the checking polynomial by multiplying the polynomial a by the polynomial represented by the received message signature, minus a sum of the polynomial c and a product of the polynomials b and m'.

6. The method of claim 2, wherein the method is performed such that coefficients of a polynomial represented by the message signature do not exceed a predetermined size.

7. The method of claim 6, wherein the predetermined size is a size of each of the coefficients of the polynomial represented by the message signature, with coefficients being considered individually.

8. The method of claim 6, wherein the predetermined size is an overall size of the coefficients of the polynomial represented by the message signature, with coefficients being considered collectively.

9. The method of claim 8, wherein the predetermined size is a size of a norm of a vector representing the coefficients of the polynomial represented by the message signature.

10. The method of claim 1, wherein the method is performed such that coefficients of a checking polynomial will not exceed a predetermined size, the checking polynomial being a difference between a product of the polynomial a and a polynomial represented by a message signature, and a sum of the polynomial c and a product of the polynomials b and m, the polynomial represented by the message signature comprising a sum of the polynomial t and a product of the polynomials s and m.

11. The method of claim 1, wherein providing representations of the polynomials a, s, t, e_1, and e_2 comprises computing the polynomial a using a randomization technique.

12. The method of claim 11, wherein the polynomials a, s, t, e_1, and e_2 are polynomials of degree n−1.

13. The method of claim 12, wherein the polynomials a, s, t, e_1, and e_2 all have coefficients in a domain given by integers modulo a prime number q.

14. One or more computer-readable storage media having computer-executable instructions embodied thereon that, when executed by at least one processor, cause the at least one processor to perform acts comprising:
- receiving a verification key comprising:
  - a representation of a polynomial a;
  - a representation of a polynomial b, the polynomial b being derived from a sum of a polynomial e_1 and a product of the polynomial a and a polynomial s; and
  - a representation of a polynomial c, the polynomial c being derived from a sum of a polynomial e_2 and a product of the polynomial a and a polynomial t;
- receiving a message signed with a message signature, the message signature comprising a sum of the polynomial t and a product of the polynomial s and a polynomial m, the polynomial m being derived from the message; and
- a verification computer system verifying the message signature using the verification key.

15. The one or more computer-readable storage media of claim 14, wherein verification of the message signature comprises verifying that coefficients of a polynomial represented by the message signature do not exceed a predetermined size.

16. The one or more computer-readable storage media of claim 14, wherein the polynomials a, s, t, e_1, and e_2 are produced by a technique comprising randomization.

17. The one or more computer-readable storage media of claim 14, wherein verification of the message signature comprises verifying that coefficients of a checking polynomial computed from the polynomial m, the polynomial b, the polynomial c, and a polynomial represented by the message signature do not exceed a predetermined size.

18. The one or more computer-readable storage media of claim 17, wherein the checking polynomial is a difference between a product of the polynomial a and the polynomial represented by the message signature, and a sum of the polynomial c and a product of the polynomials b and m.

19. The one or more computer-readable storage media of claim 14, wherein verification of the message signature comprises verifying that:
- coefficients of a polynomial represented by the message signature do not exceed a predetermined size; and
- coefficients of a checking polynomial computed from the polynomial m, the polynomial b, the polynomial c, and a polynomial represented by the message signature do not exceed a predetermined size, the checking polynomial being a difference between a product of the polynomial a and the polynomial represented by the message signature, and a sum of the polynomial c and a product of the polynomials b and m.

20. One or more computer-readable storage media having computer-executable instructions embodied thereon that, when executed by at least one processor, cause the at least one processor to perform acts comprising:
- providing representations of polynomials m, a, s, t, e_1, and e_2, providing the representations comprising:
  - deriving the polynomial m from a message using a hash function;

computing the polynomials a, s, t, e_1, and e_2 using a randomization technique comprising one or more randomization operations at least one of which is weighted; and limiting values of coefficients of each of the polynomials m, a, s, t, e_1, and e_2 to be within a range of values, and limiting the polynomials m, a, s, t, e_1, and e_2 to be of a degree n−1;

generating a signing key comprising a representation of the polynomial s and a representation of the polynomial t; and a key generation computer system generating a verification key comprising a representation of the polynomial a, a representation of a polynomial b, and a representation of a polynomial c, the generation of the verification key comprising:

computing the polynomial b, the computation of the polynomial b comprising adding the polynomial e_1 to a product of the polynomial a and the polynomial s; and computing the polynomial c, the computation of the polynomial c comprising adding the polynomial e_2 to a product of the polynomial a and the polynomial t;

wherein coefficients of a polynomial represented by a message signature do not exceed a first predetermined size, where the message signature represents a polynomial derived from a sum computed using the polynomial t with a product computed using the polynomial m and the polynomial s; and wherein coefficients of the polynomial m, the polynomial b, the polynomial c, and a polynomial represented by the message signature are such that a checking polynomial that is a difference between a product of the polynomial a and the polynomial represented by the message signature, and a sum of the polynomial c and a product of the polynomials b and m does not exceed a second predetermined size.

* * * * *